(No Model.) 2 Sheets—Sheet 2.
W. D. EWART.
FRICTION CLUTCH.
No. 524,585. Patented Aug. 14, 1894.
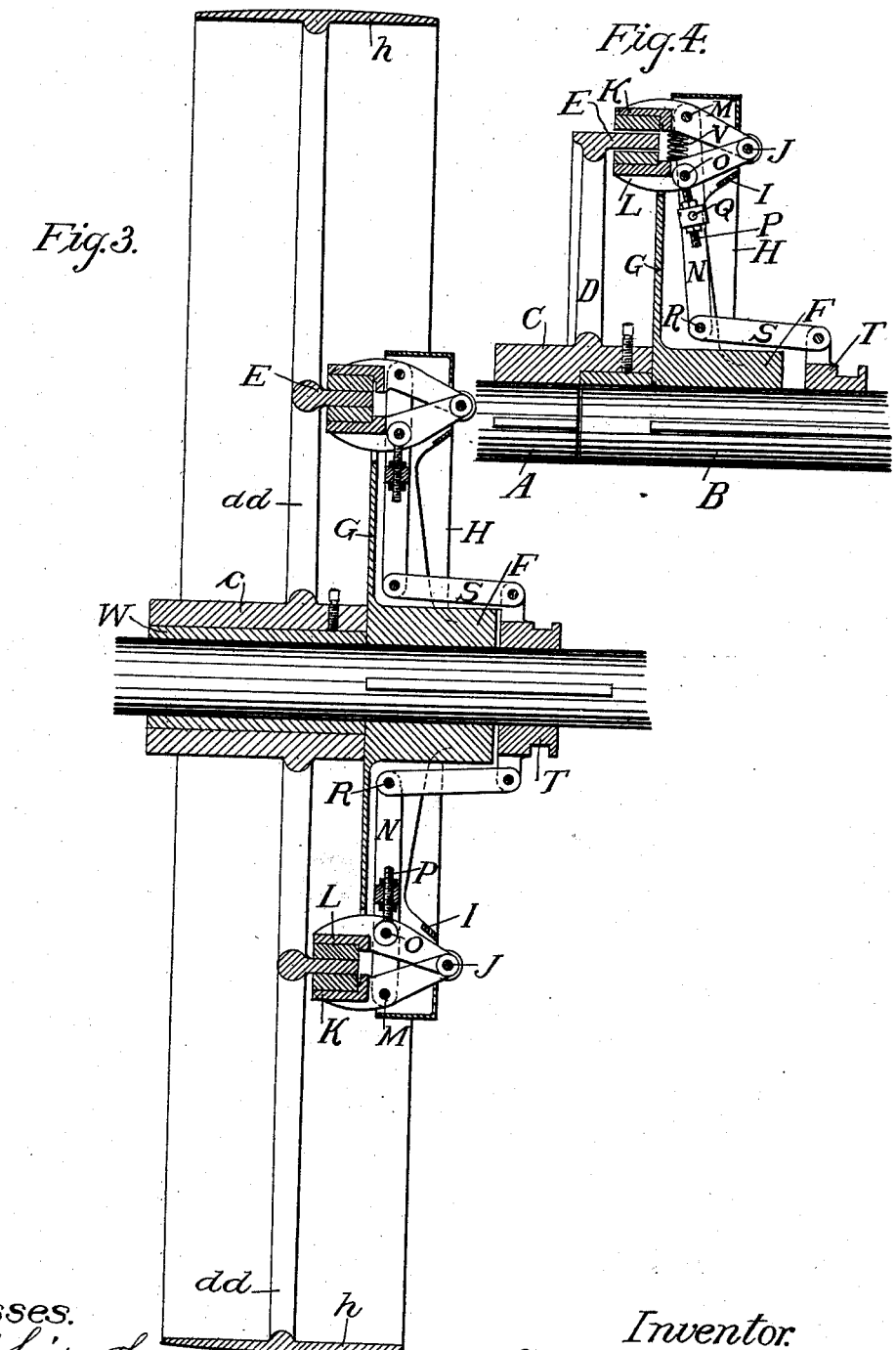
Witnesses.
Inventor.
William D. Ewart
per E. J. Ewart
Attorney.

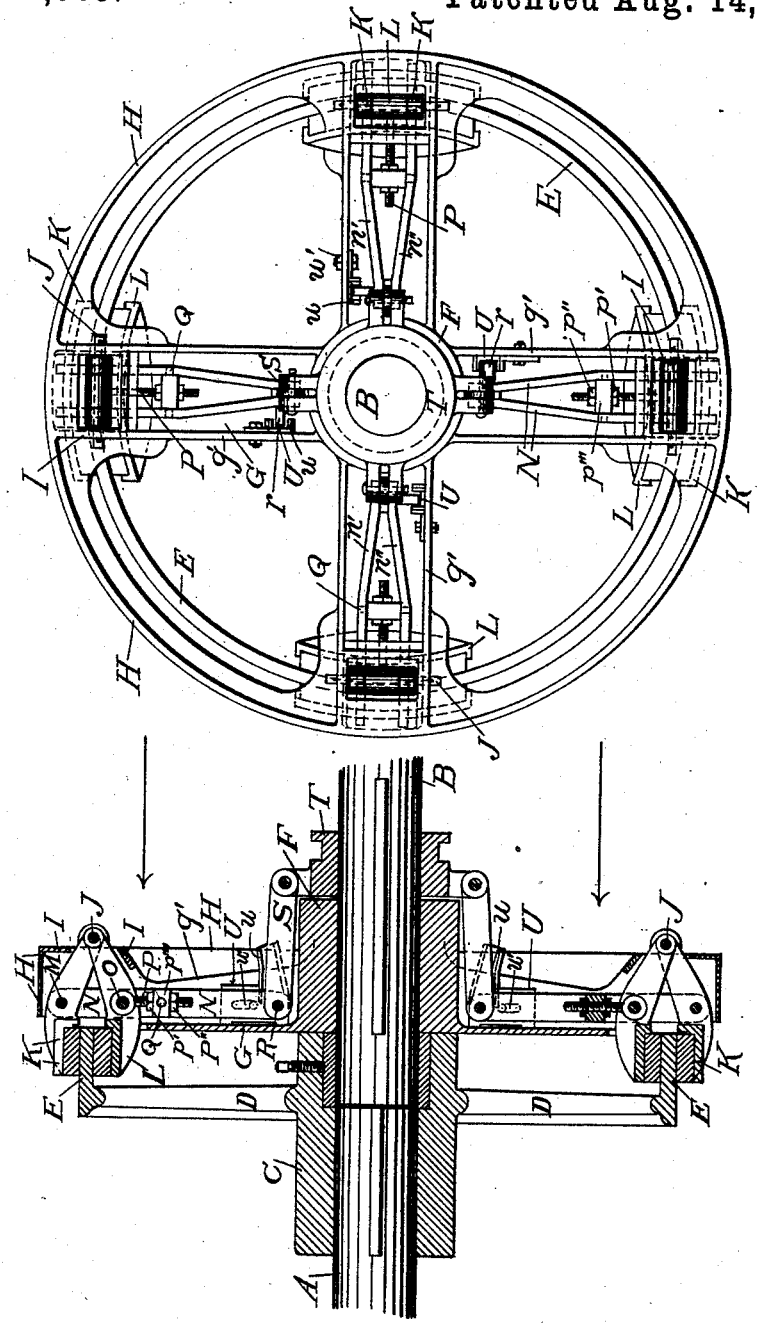

UNITED STATES PATENT OFFICE.

WILLIAM D. EWART, OF CHICAGO, ILLINOIS, ASSIGNOR TO THE LINK-BELT MACHINERY COMPANY, OF SAME PLACE.

FRICTION-CLUTCH.

SPECIFICATION forming part of Letters Patent No. 524,585, dated August 14, 1894.

Application filed April 25, 1893. Serial No. 471,731. (No model.)

*To all whom it may concern:*

Be it known that I, WILLIAM D. EWART, a citizen of the United States, residing at Chicago, Cook county, Illinois, have invented certain new and useful Improvements in Friction-Clutches, of which the following is a specification.

My invention relates to that type of friction clutches in which a rim projecting laterally from one member of the clutch is gripped by outer and inner shoes which are secured to the other member of the clutch, said shoes being provided with suitable friction surfaces to engage with said rim.

The object of my invention is to improve the gripping mechanism and the general detail of construction of parts.

My invention may be said to consist primarily in pivotally mounting the grip shoes and pivotally connecting with them toggle links adapted to operate them, and secondarily in certain details of structural arrangement, all as more fully explained hereinafter and more specifically defined in the claims.

To enable those skilled in the art to which my improvements relate to understand and practice the same, I will now proceed to describe my invention more fully, referring to the accompanying drawings, which form part of this specification, and in which similar letters of reference designate similar parts throughout the several views.

Figure 1 is a longitudinal section of a clutch coupling embodying some of my improvements, showing the clutch in engagement. Fig. 2 is an end view looking in the direction of the arrows in Fig. 1. Fig. 3 is a modification showing a longitudinal section of a clutch pulley with the clutch in engagement, and Fig. 4 is a partial longitudinal section of a clutch coupling, illustrating the relative positions of movable parts when clutch is out of engagement.

A and B are two shafts connected by my clutch coupling.

C is a hub secured to shaft A and provided with arms D which carry a laterally projecting rim E.

F is a hub secured to shaft B and bearing arms G, the latter being preferably provided with a strengthening rim H, and box-like receptacles I for the working parts of the gripping mechanism. Pivoted at J are the outer grip shoe K and inner grip shoe L, the pivot being preferably mounted in the sides of box I. Grip shoe K is pivotally connected at M with long link N of a reverse toggle, and grip shoe L is pivotally connected at O with short link P of the toggle, these links being pivotally connected with each other at Q. The extended end of toggle link N is pivotally connected at R with link S, which is connected at its farther end with shifting collar or sleeve T. All the other mechanisms are similarly connected with collar T, which may be moved back and forth on the shaft in any convenient manner for throwing the clutch into and out of engagement.

Toggle link N is preferably formed in two parts $n'$ and $n''$, giving link P a substantial bearing between them. Link P is made adjustable in its operative length by having a screw thread cut on it and nuts $p'$ and $p''$ arranged to engage with the thread above and below cross-head $p'''$, which is provided with studs journaled in divided toggle link N at Q. Arms G are preferably strengthened by flanges $g'$.

The bolt used at R is extended to one side in the form of a stud or pintle $r$, which is limited in its movements by flanged sides $u$ of guide clip U, which is preferably provided with a slotted bolt hole $u'$ for adjustment.

In Fig. 4, V is a spring for holding the grip shoes apart when clutch is out of engagement.

In Fig. 4, $h$ is a pulley rim, $d\ d$ are arms, and $c$ is the pulley hub preferably provided with anti-friction bushing W.

In the operation of my device, I take advantage of the properties of toggle links to secure an exceedingly powerful, self-locking gripping mechanism, which when thrown out of engagement will give a very free release. The pivotal points M and O, Fig. 1, are, of course, nearest each other when the two links N and P are in line, and the limit of the gripping power obtainable, so far as the operating mechanism is concerned, is the tensile strength of long link N and the resistance to compression of the short link P. In other clutches of this general type, the grip shoes are practically at right angles to the stems or shanks which move them radially, the latter being held in guide ways to keep them parallel. In such cases when the pressure comes on the grip shoes, the tendency is toward tilting the stems violently in their guide ways and causing excessive friction in them, and any spring in the metal of the stems permits the grips to tilt slightly relative to the friction rim, so that there is an uneven pressure between the friction surfaces and consequent loss of power. In my device the operating mechanism is at its greatest advantage at the time when it is under its greatest strain.

When throwing the clutch into engagement, I not only bring the toggle links into line with each other, but pass their mutual pivotal points slightly beyond the center lines toward the arms of the clutch and against them, or suitable stops in them, thus making the device self-locking. The movements of pivotal points M and O relative to each other are very slight while links N and P are nearly in line, but as link S draws link N away from this position, the distance between M and O increases rapidly, thus spreading grip shoes K and L rapidly apart, and effecting a free release from possibility of contact with friction rim E, as will be seen by comparing Fig. 1 with Fig. 4.

Grip shoes K and L, being pivoted at J, might, under the influence of centrifugal force when running, or gravity when standing, while clutch is disengaged, come into contact with rim E, and to provide against this, I arrange in some of my clutches, in the case of each pair of toggle links, an adjustably located guide, which shall engage with one of the links or an extension thereof in such a manner as will limit its longitudinal movement. The particular form shown in the drawings is a clip or plate U having guide flanges, as $u$, adapted to engage with a stud or pintle $r$, projecting from an extension of toggle link N. These flanges are far enough apart at the inner portion to permit a free longitudinal movement in the toggle links, so that the grip shoes can seat themselves perfectly on the friction rim when in engagement, but at the outer portion the guide way is contracted so as to prevent longitudinal movement of the toggle links, and cause them to combine with pivot J to hold the grip shoes in a definite position entirely free from danger of contact with friction rim E. The exact radial location of guide clip U is made adjustable, preferably by the use of slotted bolt hole $u'$.

In some cases I prefer to use a spring as at V to press the grip shoes apart when clutch is not in engagement, arranging the arms and rim so that the movement of the grip shoes apart will be properly limited. I, of course, arrange for suitable bearing surfaces in the arms against which the grip shoes can press laterally to prevent their being twisted by the strain on them when clasping the friction rim in the transmission of power.

In the construction of this general type of friction clutches, it is customary to make the arms which carry the gripping mechanisms very heavy to stand individually the strains which come upon them. These separate arms revolving in the air are dangerous to life and cause objectionable air currents at high velocities. It will be noticed that my use of strengthening rim H so braces the arms relatively as to enable me to employ very much lighter arms, and at the same time to provide a protection against the danger and objectionable currents referred to. Some have tried attaching the grip shoes to the pulley, in the case of clutch pulleys, but without success, owing to practical difficulties in the foundry, and have therefore returned to the general practice of attaching simply the friction ring to the pulley arms and constructing the clutch mechanisms on a separate clutch member provided with arms designed specially for that purpose. In no case, however, so far as I am aware, have these separate clutch arms been peripherally connected by a strengthening and protecting rim as in my clutch.

It is evident that my clutch can readily be applied in any well known manner to pulleys, wheels, sheaves, drums, &c.

I have set forth herein the forms of toggles and relative arrangements of pivotal points which I have thus far found most convenient and practical, but it is evident that quite a variety of modifications could be made in details without departing from the spirit of my invention; as, for instance, the stems or shanks of the grip shoes might be pivoted nearer to the shoes in such a manner that the stems would extend back of the pivotal points to be engaged pivotally by reverse or direct toggles as the relative arrangement may require, and the toggle links themselves may be pivotally connected with each other in any well known manner and operated by any device which will bring them sufficiently into line with each other to cause the grips to clasp the friction rim properly. I do not, therefore, wish to be limited as to any such details of construction, except as specified in the claims.

I am aware that toggle links have been used in friction clutches to operate clasping devices of various sorts, and I do not claim them broadly in such connections; but What I do claim, and desire to secure by Letters Patent of the United States, is—

1. In a friction clutch device, a clutch member having a laterally projecting friction rim, and a clutch member provided with pivotally mounted grip shoes arranged in pairs and adapted to engage said friction rim internally and externally, in combination with toggle links pivotally connected with said grip shoes at points between their friction surfaces and their pivotal mounting, substantially as set forth.

2. In a friction clutch device, the combination with a clutch member having a laterally projecting friction rim, of a clutch member provided with arms having box-like receptacles in which are mounted grip-shoes and having a continuous strengthening and protecting rim connecting the outer ends of said arms, and reverse toggle links for operating said grip-shoes, substantially as set forth.

3. In a friction clutch device, the combination of a friction rim, a pair of pivotally mounted internal and external grip shoes adapted to engage same, a pair of toggle links pivotally connected with said grip shoes to operate them, and a guide with which one of the toggle links or an extension thereof engages to limit its longitudinal movement, substantially as shown and described.

4. In a friction clutch device, a pair of pivotally mounted internal and external grip shoes adapted to engage a friction rim, and a pair of toggle links pivotally connected with said grip shoes at points between their friction surfaces and their pivotal mounting, in combination with a spring mounted between portions of said grip shoes to separate their friction surfaces from the friction rim when the clutch mechanism is thrown out of engagement, substantially as shown and described.

5. In a friction clutch coupling, a clutch member having a laterally projecting friction rim, internal and external grip shoes arranged in pairs and adapted to engage said rim, and arms in which said grip shoes are mounted, and between the flanges of which arms the operating devices are inclosed in combination with a continuous strengthening and protecting rim connecting the outer ends of the said arms, substantially as described and for the purposes set forth.

6. A clutch pulley provided with a laterally projecting friction rim, and an opposite clutch member provided with pairs of grip shoes engaging said rim and pivotally mounted in a clutch frame having a continuous protecting rim embracing the clutch mechanism, substantially as and for the purpose set forth.

WILLIAM D. EWART.

Witnesses:
  STANTON B. PECK,
  EDWARD F. GORTON.